(12) United States Patent
Fischer et al.

(10) Patent No.: US 12,012,174 B2
(45) Date of Patent: Jun. 18, 2024

(54) TILT-DECOUPLED STEERING DEVICE OF A MOTORBIKE

(71) Applicant: Bayerische Motoren Werke Aktiengesellschaft, Munich (DE)

(72) Inventors: Dirk Fischer, Garching (DE); Gerhard Forster, Regensburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 528 days.

(21) Appl. No.: 17/312,492

(22) PCT Filed: Dec. 2, 2019

(86) PCT No.: PCT/EP2019/083223
§ 371 (c)(1),
(2) Date: Jun. 10, 2021

(87) PCT Pub. No.: WO2020/151859
PCT Pub. Date: Jul. 30, 2020

(65) Prior Publication Data
US 2022/0055711 A1  Feb. 24, 2022

(30) Foreign Application Priority Data
Jan. 23, 2019 (DE) ............ 10 2019 101 612.6

(51) Int. Cl.
*B62K 21/04* (2006.01)
*B62K 21/08* (2006.01)
*B62K 21/20* (2006.01)

(52) U.S. Cl.
CPC .............. *B62K 21/04* (2013.01); *B62K 21/08* (2013.01); *B62K 21/20* (2013.01)

(58) Field of Classification Search
CPC ........ B62K 21/00; B62K 21/04; B62K 21/08; B62K 21/18; B62K 21/20; B62K 21/22
See application file for complete search history.

(56) References Cited

U.S. PATENT DOCUMENTS

| 8,833,785 B2 * | 9/2014 | Wagner | B62K 21/00 |
| | | | 180/219 |
| 9,745,017 B2 * | 8/2017 | Tomura | B62K 21/20 |
| (Continued) | | | |

FOREIGN PATENT DOCUMENTS

| CN | 1408603 A | 4/2003 |
| CN | 101384472 A | 3/2009 |
| (Continued) | | |

OTHER PUBLICATIONS

International Search Report (PCT/ISA/210) issued in PCT Application No. PCT/EP2019/083223 dated Feb. 2, 2020 with English translation (four (4) pages).

(Continued)

*Primary Examiner* — Kevin Hurley
*Assistant Examiner* — Hosam Shabara
(74) *Attorney, Agent, or Firm* — Crowell & Moring LLP

(57) ABSTRACT

A tilt-decoupled steering device of a motorbike includes a handlebar bridge which receives a handlebar, a fork bridge which receives a fork leg, and a decoupling element connecting the handlebar bridge to the fork bridge. The handlebar bridge (11) is rotatable about a steering axis and is secured about a tilt axis orthogonal to the steering axis. The fork bridge is rotatable about the steering axis and about the tilt axis. The decoupling element is elastic and is designed to transfer a steering movement in a steering direction about the steering axis from the handlebar bridge to the fork bridge, and to compensate for a tilting movement in a tilting direction about the tilt axis of the fork bridge relative to the handlebar bridge via elastic deformation.

15 Claims, 3 Drawing Sheets

(56) References Cited

U.S. PATENT DOCUMENTS

| 10,118,665 B2 * | 11/2018 | Seidl | B62K 25/24 |
|---|---|---|---|
| 2003/0059145 A1 | 3/2003 | Couturet | |
| 2005/0046141 A1 * | 3/2005 | Gogo | F16F 9/064 |
| | | | 280/271 |
| 2009/0058040 A1 | 3/2009 | Woesle et al. | |
| 2016/0031520 A1 | 2/2016 | Tomura et al. | |

FOREIGN PATENT DOCUMENTS

| CN | 105314042 A | 2/2016 | |
|---|---|---|---|
| DE | 37 08 579 A1 | 9/1988 | |
| DE | 41 10 954 A1 | 10/1992 | |
| DE | 44 22 201 A1 | 5/1995 | |
| DE | 10 2006 011 850 A1 | 9/2007 | |
| EP | 0 507 088 A1 | 10/1992 | |
| FR | 2 744 980 A1 | 8/1997 | |
| WO | WO-9513207 A1 * | 5/1995 | B62K 21/20 |
| WO | WO 97/26178 A1 | 7/1997 | |
| WO | WO-9726178 A1 * | 7/1997 | B62K 21/00 |
| WO | WO-9828183 A1 * | 7/1998 | B62K 21/20 |

OTHER PUBLICATIONS

German-language Written Opinion (PCT/ISA/237) issued in PCT Application No. PCT/EP2019/083223 dated Feb. 2, 2020 (five (5) pages).

German-language Search Report issued in German Application No. 10 2019 101 612.6 dated Aug. 16, 2019 with partial English translation (13 pages).

Chinese-language Office Action issued in Chinese Application No. 201980085819.3 dated Feb. 22, 2022 with English translation (15 pages).

\* cited by examiner

TILT-DECOUPLED STEERING DEVICE OF A MOTORBIKE

BACKGROUND AND SUMMARY OF THE INVENTION

The invention relates to a tilt-decoupled steering apparatus of a motorcycle, and to a motorcycle having a tilt-decoupled steering apparatus of this type.

A multiplicity of front wheel suspension systems in motorcycles or single-track motor vehicles are already known in the prior art. The known front wheel suspension systems also include the front wheel suspension system which is currently known under the designation Telelever. This consists substantially of an adapted telescopic fork, a trailing arm and a suspension strut. The front wheel of the motorcycle is controlled and a steering movement is transmitted to the front wheel by way of the telescopic fork which comprises two fork legs and two fork bridges which connect the fork legs to one another. Here, as a rule, the telescopic fork or the fork legs does/do not take over the suspension and damping of the front wheel. A first fork bridge connects the fork legs at an upper end close to the motorcycle handlebar, and, in the prior art, is connected rotatably to a steering head of the motorcycle or to a frame of the motorcycle. A second fork bridge connects the fork legs close to the front wheel. The trailing arm is connected rotatably to the second fork bridge and the motorcycle frame, and is therefore mounted rotatably like a swing arm. The suspension strut is arranged between the trailing arm and the motorcycle frame or the steering head of the motorcycle, which suspension strut supports the trailing arm and motorcycle frame or steering head of the motorcycle with respect to one another. In the case of a movement of the front wheel upward or downward, the movement is sprung or damped by the suspension strut via the lower fork bridge and the trailing arm. Here, not only a rebound or compression movement along the fork legs or along the suspension strut occurs on account of the kinematics of the front wheel suspension, but rather also a rotation or a tilt movement of the entire telescopic fork about a tilt axis on the steering head, which tilt axis is orthogonal with respect to the steering axis, with the result that the angle between the telescopic fork and the motorcycle frame changes. In the case of the systems which are known in the prior art, the tilt movement is usually transmitted directly to the motorcycle handlebar and via the latter to the rider of the motorcycle. Tilt movements of this type can unsettle the rider and, for example, can lead to riding errors as a result.

Therefore, the invention is based on the object of overcoming the abovementioned disadvantages and of providing a steering apparatus, by way of which the motorcycle handlebar is decoupled from a tilt movement of the fork legs about a tilt axis which runs orthogonally with respect to the steering axis.

The object is achieved by way of the combination of features according to patent claim 1.

According to the invention, a tilt-decoupled steering apparatus of a motorcycle is proposed. The steering apparatus comprises a handlebar bridge for receiving a motorcycle handlebar, a fork bridge for receiving a fork leg, and a decoupling element which connects the handlebar bridge to the fork bridge. The handlebar bridge is mounted such that it can be rotated about a steering axis of the motorcycle and is fixed about a tilt axis which is orthogonal with respect to the steering axis, as a result of which the handlebar bridge or the motorcycle handlebar which is received on it can be rotated only about the steering axis and not about the tilt axis. The fork bridge is mounted such that it can be rotated about the steering axis and about the tilt axis, with the result that the fork bridge with the fork legs which are preferably arranged on it can carry out both a steering movement about the steering axis and a tilt movement about the tilt axis. Moreover, the decoupling element is of elastic configuration. Furthermore, the decoupling element is configured to transmit a steering movement in a steering direction about the steering axis from the handlebar bridge to the fork bridge, and to compensate for a tilt movement in a tilt direction about the tilt axis of the fork bridge with respect to the handlebar bridge by way of elastic deformation.

Since both the handlebar bridge and the fork bridge can be rotated about the steering axis, a steering movement or a steering force can be transmitted by the decoupling element. In the case of a tilt movement, however, the handlebar bridge cannot or should not follow the tilt movement, since the handlebar bridge cannot be tilted about the tilt axis. In the case of a steering movement, longitudinal forces are introduced into the decoupling element, which longitudinal forces are transmitted along a longitudinal axis of the decoupling element between the handlebar bridge and the fork bridge. Since the attachment of the decoupling element to the handlebar bridge and the cable bridge lie substantially in one plane, the longitudinal forces do not lead to a substantial deformation of the decoupling element about the steering axis. In the case of the tilt movement, transverse forces are introduced into the decoupling element, the entry and exit points of the transverse forces being spaced apart along the longitudinal axis of the decoupling element. Since the handlebar bridge is additionally fixed against a movement about the tilt axis, a mechanical stress builds up in the decoupling element as a result of the transverse forces, such that the decoupling element is deformed elastically and the fork bridge continues to remain connected to the handlebar bridge.

It is particularly advantageous if the decoupling element exhibits rigid behavior in the case of a steering movement or about the steering axis, with the result that the steering movement is transmitted directly and substantially without elastic deformation.

In addition, a variant of the steering apparatus is advantageous, in the case of which the steering apparatus comprises a steering pin which is fixed on the handlebar bridge, extends coaxially along the steering axis, can be mounted rotatably on a motorcycle frame of the motorcycle, and can preferably be received on the motorcycle frame or a steering head which is connected to the motorcycle frame, with the result that the handlebar bridge can be connected by way of the steering pin to the motorcycle frame such that it can be rotated about the steering axis and is fixed with respect to the tilt axis.

In order to make a rotation of the fork bridge both about the steering axis and about the tilt axis possible, a further advantageous refinement of the invention provides that, furthermore, the steering apparatus comprises a pivot bearing with an inner ring and an outer ring. The inner ring of the pivot bearing is arranged on the steering pin or the motorcycle frame concentrically with respect to the steering axis. Moreover, the outer ring of the pivot bearing is connected to the fork bridge, with the result that the fork bridge can be connected by way of the pivot bearing to the motorcycle frame such that it can be rotated about the steering axis and about the tilt axis. For this purpose, the inner ring preferably has a spherical, convex external diameter, the outer ring being shaped concavely on the inner side in a manner which corresponds to the former, with the result that the outer ring can be moved around the inner ring both about the rotational axis and about the tilt axis or about a bearing point which is defined in the center of the inner ring.

If the decoupling element is arranged outside a plane of the tilt axis, about which the tilt movement takes place, the decoupling element has to compensate for a greater movement which is produced by way of the spacing from the plane, with the result that the decoupling element is deformed to a more pronounced extent. Therefore, one advantageous development provides that the decoupling element is arranged in one plane with the tilt axis. The decoupling element is preferably arranged symmetrically in the plane, with the result that a longitudinal axis of the decoupling element lies in the plane.

In order to make a transmission of the steering movement about the steering axis and a flexibility or elasticity about the tilt axis possible, one development which is likewise advantageous provides that the decoupling element is flat and extends substantially in a plane orthogonally with respect to the steering axis. As a result, longitudinal forces which are introduced into the decoupling element can be forwarded into the decoupling element about the steering axis without a substantial deformation of the decoupling element.

Furthermore, the decoupling element is preferably resilient, and is formed from spring steel in the case of one advantageous variant.

As a result of a flat configuration and spring steel as material of the decoupling element, this configuration forms substantially a flat spring or a leaf spring with only one spring leaf, it being possible for the decoupling element to be of differently shaped configuration in the plane.

For the connection of the decoupling element to the handlebar bridge and the fork bridge, one likewise advantageous design variant of the steering apparatus provides that the decoupling element has at least one first connecting arrangement for fixing the decoupling element on the handlebar bridge and at least one second connecting arrangement for fixing the decoupling element on the fork bridge. The connecting arrangements preferably lie in a plane which is orthogonal with respect to the steering axis, and can be formed, for example, in each case from a recess in the decoupling element, such as a hole, and a screw connection of the decoupling element through the recesses on the fork bridge and the handlebar bridge.

In order to make possible a transmission, which is as play-free as possible, of the steering movement from the handlebar bridge to the fork bridge and therefore a play-free steering system, it is preferably provided, furthermore, that the first connecting arrangement is configured to connect the decoupling element to the steering bridge in a play-free manner about the steering axis in the steering direction, and the second connecting arrangement is configured to connect the decoupling element to the fork bridge in a play-free manner about the steering axis in the steering direction. To this end, for example, locating screws can be used. As an alternative, the fixing of the decoupling element on the handlebar bridge and the fork bridge can be disconnected from the play-free transmission of the steering movement, by the connecting arrangements comprising, for example, both a screw for fixing and a locating pin for the play-free transmission of the steering movement.

A further advantageous variant of the invention provides that the decoupling element is of annular configuration. Two first connecting arrangements and two second connecting arrangements are then provided in an alternating manner with respect to one another and distributed uniformly in the circumferential direction. Here, furthermore, the decoupling element is arranged so as to extend around the steering axis, with the result that the steering axis runs through and preferably centrally through a central recess which is formed by the annular element.

As an alternative to an annular variant, one likewise advantageous alternative provides that the decoupling element is of arcuate configuration.

From the top view in the direction of the steering axis, the decoupling element therefore has a shape which is similar to a symmetrical two-armed boomerang. Furthermore, it is provided here that in each case one second connecting arrangement is provided on opposite end sections of the decoupling element, and at least one first connecting arrangement is provided between the second connecting arrangements, the at least one first connecting arrangement preferably being provided symmetrically between the second connecting arrangements. In addition, the decoupling element is arranged so as to extend around the steering axis, with the result that the steering axis preferably runs through a line of symmetry of an area which is defined by the arcuate element.

One advantageous variant provides, in addition, that a safety pin is provided on the handlebar bridge or the fork bridge, which safety pin extends parallel to the steering axis from the handlebar bridge or the fork bridge to the respective other one and extends into a recess which is provided on the respective other one. If a fracture of the decoupling element or an excessive deformation of the decoupling element in the steering direction about the steering axis occurs, a radial outer face can come to bear against an inner face of the recess, which inner face points toward the outer face of the safety pin, with the result that a steering movement about the steering axis can be transmitted via the safety pin between the handlebar bridge and the fork bridge.

A further aspect of the invention relates, in addition, to a motorcycle comprising a steering apparatus according to the invention, the motorcycle having, furthermore, a front wheel suspension system with two fork legs, an upper fork bridge, a lower fork bridge, a trailing arm and a suspension strut. The upper and the lower fork bridge connect the fork legs to one another. The trailing arm connects the lower fork bridge movably to a motorcycle frame of the motorcycle, and the suspension strut supports the trailing arm with respect to the motorcycle frame. Here, the upper fork bridge is that fork bridge of the steering apparatus, by way of which the front wheel suspension is tilt-decoupled from a motorcycle handlebar of the motorcycle.

Accordingly, the motorcycle has substantially what is currently known as a Telelever, and a steering apparatus according to the invention, the upper fork bridge of which is tilt-decoupled from the handlebar bridge, with the result that a tilt movement of the front wheel suspension system or the fork legs is not transmitted to the motorcycle handlebar.

The features which are disclosed in the preceding text can be combined in any desired manner in so far as this is technically possible and the features are not inconsistent with one another.

Other advantageous developments of the invention are characterized in the subclaims and/or will be shown in greater detail in the following text together with the description of the preferred implementation of the invention on the basis of the figures.

The figures are diagrammatic by way of example. Identical designations in the figures indicate identical functional and/or structural features.

DETAILED DESCRIPTION OF THE DRAWINGS

Figure 1:
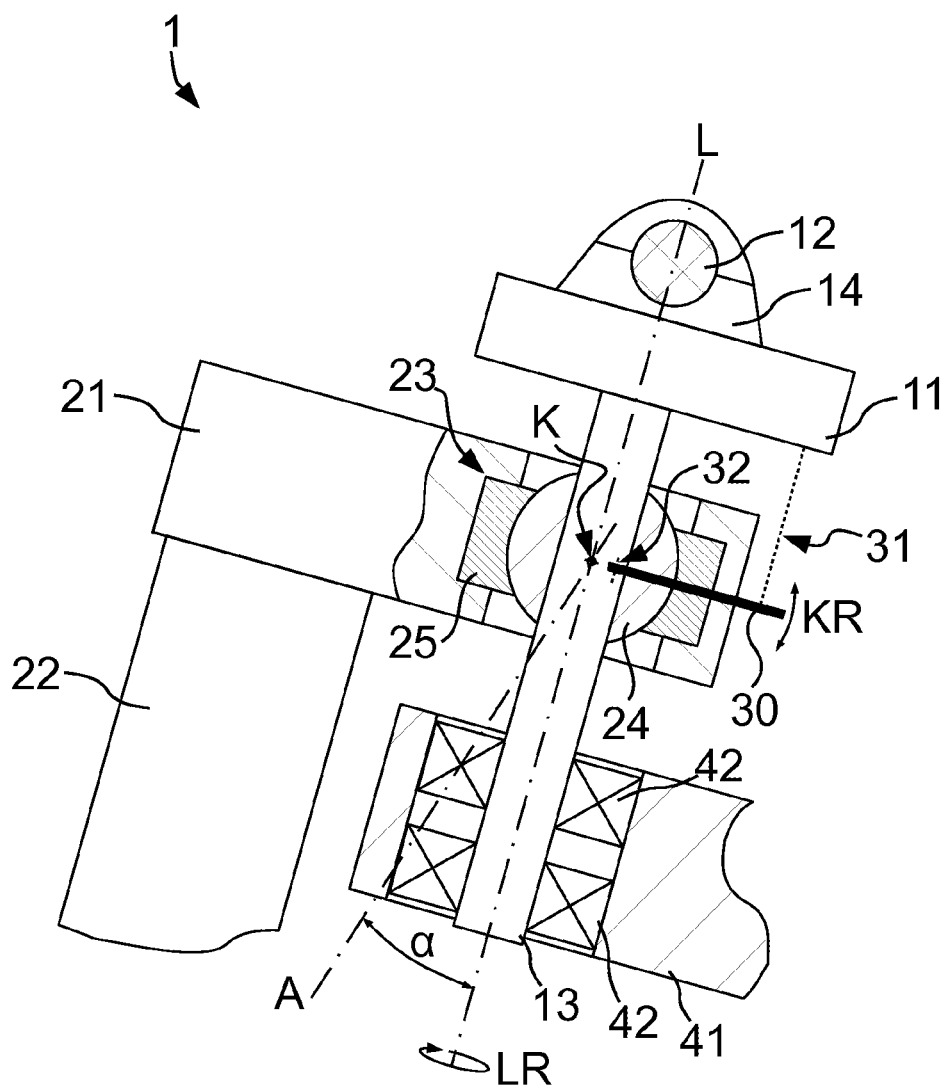
FIG. 1 shows a diagrammatic tilt-decoupled steering apparatus in accordance with the present invention in a lateral sectional view.
Figure 2:
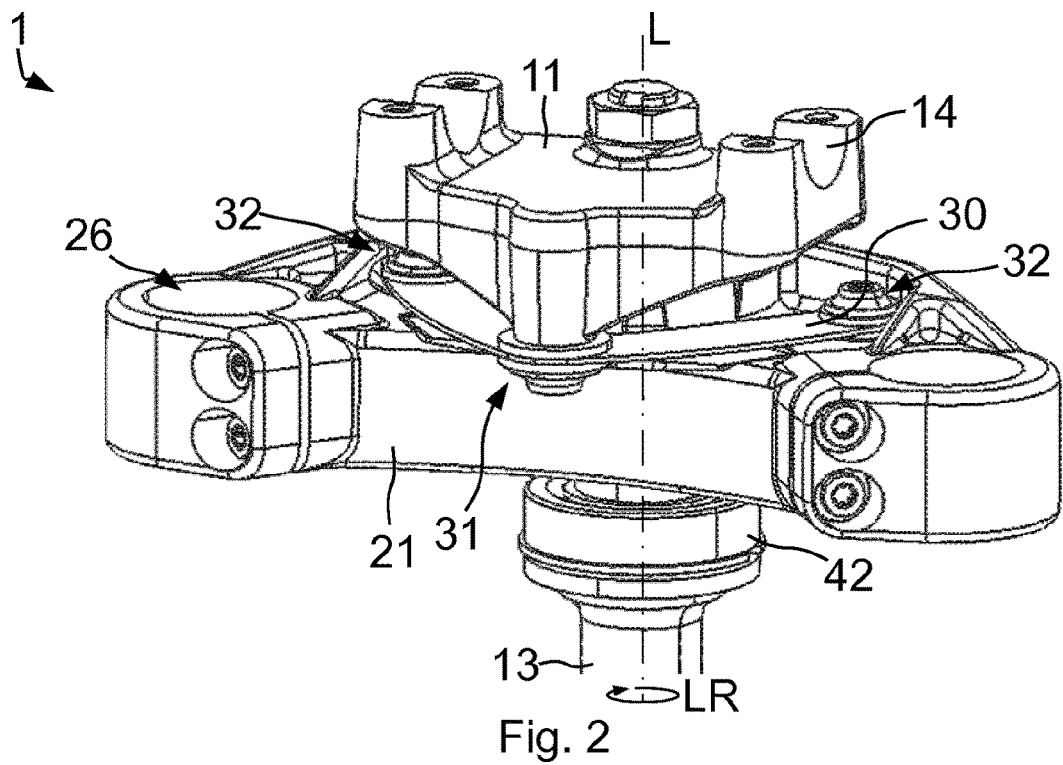
FIG. 2 shows a perspectively illustrated steering apparatus in accordance with the present invention.

FIG. 1 shows the steering apparatus according to the invention in a partially sectioned side view. The steering axis L lies in the plane of the illustration, and the tilt axis K lies perpendicularly with respect to the plane of the illustration, it being possible for the orientation of the tilt axis K to change in a manner which is dependent on a steering angle. The tilt axis K always runs, however, in a plane which is oriented orthogonally with respect to the steering axis L. In the case of a suspension movement of the front wheel suspension system, the fork bridge 21, with the preferably two fork legs 22 which are received on it, pivots about the tilt axis K, with the result that the angle α between the steering axis L and an axis A which runs from the bearing point of the fork bridge 21 to the front wheel changes. The fork bridge 21 is mounted via a pivot bearing 23 on a steering pin 13, with the result that the fork bridge 21 can be both rotated about the steering axis L and tilted about the tilt axis K. Here, the bearing point of the fork bridge 21 is preferably defined by the pivot bearing 23 and lies on the steering axis L or at the point of intersection of the steering axis L and the tilt axis K, with the result that the fork bridge 21 can be pivoted about its bearing point in all directions. The steering pin 13 is preferably fixed on a handlebar bridge 11 such that it cannot be rotated. On the handlebar bridge 11, a motorcycle handlebar 12 can be fixed on a handlebar receptacle 14 of the handlebar bridge 11. Furthermore, the steering pin 13 is mounted or can be mounted rotatably by way of bearings 42 on a motorcycle frame 41 or a steering head which is connected to the motorcycle frame 41, on a section of the steering pin 13 which lies opposite the handlebar bridge 11, with the result that the handlebar bridge 11 can be rotated or steered with respect to the motorcycle frame 41 about the steering axis L which runs concentrically with the steering pin 13, but cannot tilt with respect to the motorcycle frame 41. In order to transmit a steering movement along a steering direction LR about the steering axis L from the handlebar bridge 11 to the fork bridge 21, a decoupling element 30 is provided. The decoupling element 30 is arranged between the handlebar bridge 11 and the fork bridge 21, and is fixed on the handlebar bridge 11 via at least one first connecting arrangement 31 and on the fork bridge 21 via at least one second connecting arrangement 32. The decoupling element 30 extends substantially in a plane orthogonally with respect to the steering axis L, with the result that steering forces which are introduced into the decoupling element 30 as longitudinal forces about the steering axis L or along the steering direction LR can be transmitted from the first connecting arrangement 31 to the second connecting arrangements 32 without a substantial deformation of the decoupling element 30, as a result of which a steering movement can be transmitted directly from the handlebar bridge 11 to the fork bridge 21, and the decoupling element 30 exhibits rigid behavior about the steering axis L. In the direction of the tilt movement about the tilt axis K, the first connecting arrangement 31 is spaced apart from the second connecting arrangements 32, with the result that tilt forces about the tilt axis K or along the tilt direction KR are introduced as transverse forces into the decoupling element 30, which transverse forces, lying substantially perpendicularly on the plane which is orthogonal with respect to the steering axis L, lead to an elastic deformation of the decoupling element 30, the decoupling element 30 compensating, by way of elastic deformation, for a changing spacing between the handlebar bridge 11 and the fork bridge 21 in the case of a change of the angle α or in the case of a tilt movement in the tilt direction KR.

The pivot bearing 23 has a spherical inner ring 24 which is arranged on or around the steering pin 13 and is preferably fixed on the latter firmly for conjoint rotation, and an outer ring 25 with an inner face which corresponds to the inner ring 24, with the result that the outer ring 25 or the fork bridge which is connected to the outer ring 25 can be rotated, in a manner which is limited by stops, in all directions about the inner ring 24 or the bearing point which lies centrally in the inner ring 24.

Figure 3:
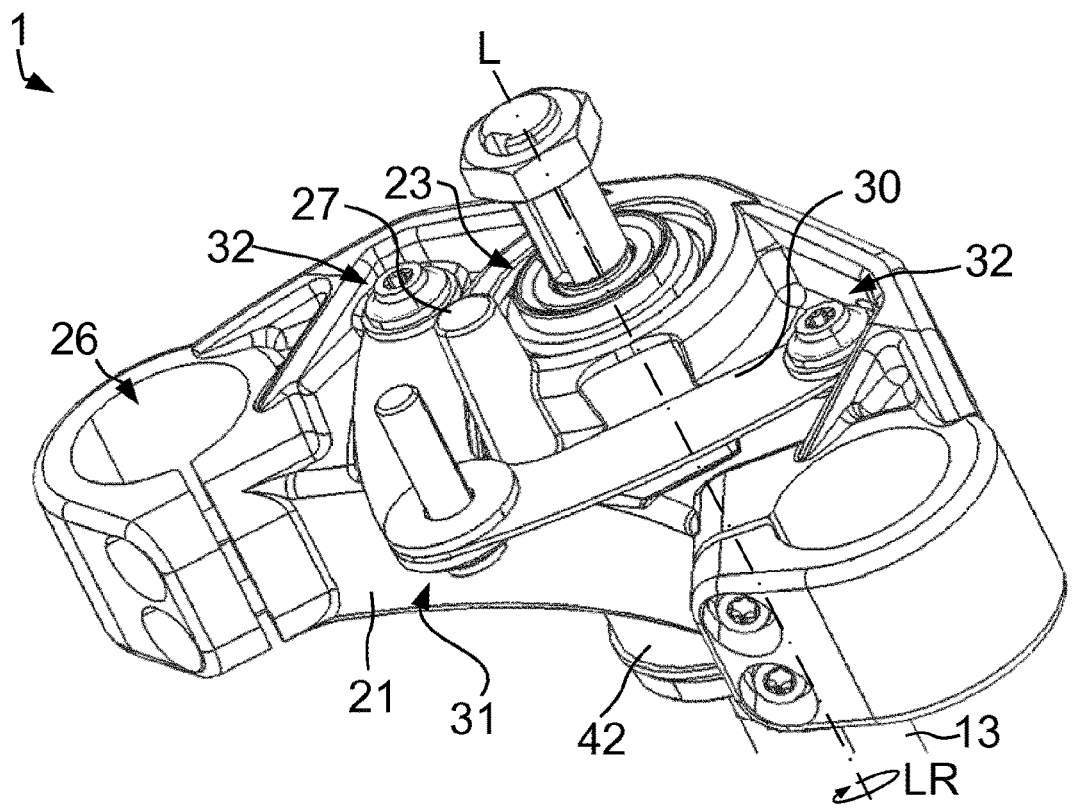
FIG. 3 shows the steering apparatus of FIG. 2 perspectively illustrated without a handlebar bridge.
Figure 4:
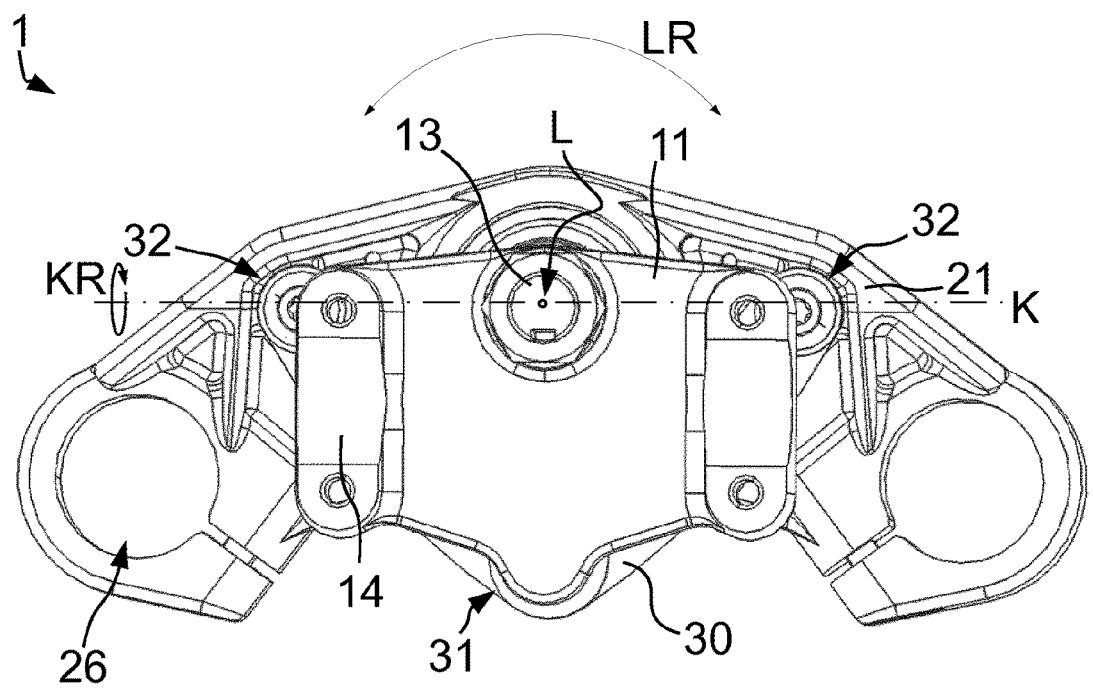
FIG. 4 shows the steering apparatus of FIG. 2 from a top view.
Figure 5:
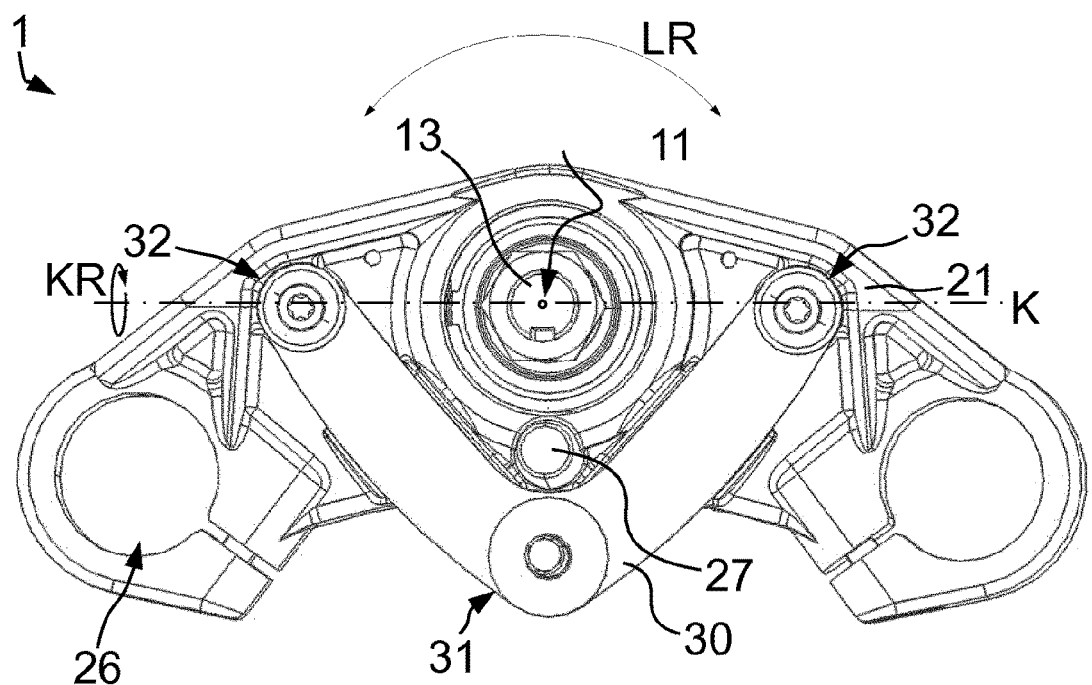
FIG. 5 shows the steering apparatus of FIG. 2 from the top view without a handlebar bridge.

FIGS. 2 to 5 show one advantageous design variant of the steering apparatus 1, the steering apparatus 1 being shown without the handlebar bridge 11 in FIGS. 3 and 5.

The illustrated variant of the steering apparatus 1 provides in each case two fork leg receptacles 26 on the fork bridge 21, with the result that two fork legs 22 can be fixed on the fork bridge 21. Moreover, the decoupling element 30 is configured in an arcuate manner or in the shape of a boomerang, and is arranged symmetrically about the steering axis L, in each case a second connecting arrangement 32 being provided on in each case one end-side section of the decoupling element 30. Furthermore, the second connecting arrangements 32 are arranged on the tilt axis K. A first connecting arrangement 31 is provided symmetrically between the second connecting arrangements 32 in a symmetry plane through the steering apparatus 1, with the result that a tilt movement of the fork bridge 21 with respect to the handlebar bridge 11 which is fixed counter to the tilt movement is compensated for by the decoupling element by way of a symmetrical deformation, in each case the sections of the decoupling element 30 between one of the second connecting arrangements 32 and the first connecting arrangement 31 being deformed, in particular, reversibly or elastically in the tilt direction KR.

Furthermore, FIGS. 3 and 5 show a safety pin 27 which is configured by the fork bridge 21 and extends in the direction of or into a recess (not shown) of the handlebar bridge 11. The safety pin 27 is configured to transmit a steering movement or steering force in the case of an impermissible deformation of the decoupling element 30 between the handlebar bridge and the fork bridge.

The implementation of the invention is not restricted to the preferred exemplary embodiments which are indicated above. Rather, a number of variants are conceivable which make use of the solution which is shown, even in the case of designs of a fundamentally different type.

What is claimed is:

1. A tilt-decoupled steering apparatus of a motorcycle, comprising:
   a handlebar bridge configured to receive a motorcycle handlebar;
   a fork bridge configured to receive a fork leg; and
   a decoupling element configured to connect the handlebar bridge to the fork bridge,
   wherein the handlebar bridge is rotatable about a steering axis and is fixed about a tilt axis orthogonal to the steering axis, the fork bridge is rotatable about the steering axis and about the tilt axis, and the decoupling element is elastic and is configured to transmit a steering movement in a steering direction about the steering axis from the handlebar bridge to the fork bridge, and to compensate for a tilt movement in a tilt direction about the tilt axis of the fork bridge relative to the handlebar bridge by elastic deformation.

2. The steering apparatus according to claim 1, further comprising:

a steering pin fixed on the handlebar bridge, wherein the steering pin extends coaxially along the steering axis and is configured to be mounted rotatably on a motorcycle frame of the motorcycle such that the handlebar bridge is connectable by the steering pin to the motorcycle frame.

3. The steering apparatus according to claim 2, further comprising:

a pivot bearing having an inner ring and an outer ring, wherein the inner ring of the pivot bearing is configured to be arranged on the steering pin or the motorcycle frame concentrically with the steering axis, the outer ring of the pivot bearing is configured to be connected to the fork bridge.

4. The steering apparatus according to claim 3, wherein the decoupling element is arranged in a plane with the tilt axis.

5. The steering apparatus according to claim 4, wherein the decoupling element is flat and extends substantially in a plane orthogonal to the steering axis.

6. The steering apparatus according to claim 5, wherein the decoupling element is formed from spring steel.

7. The steering apparatus according to claim 6, wherein the decoupling element has at least one first connecting arrangement by which the decoupling element is fixable on the handlebar bridge and at least one second connecting arrangement by which the decoupling element is fixable on the fork bridge.

8. The steering apparatus according to claim 7, the at least one first connecting arrangement and the at least one second connecting arrangement are configured to connect the decoupling element to the handlebar bridge in a play-free manner in the steering direction about the steering axis.

9. The steering apparatus according to claim 8, wherein the decoupling element is of annular configuration, and the at least one first connecting arrangement and the at least one second connecting arrangement comprises two first connecting arrangements and two second connecting arrangements being provided in an alternating manner with respect to one another and distributed uniformly in the circumferential direction, and the decoupling element is configured to extend around the steering axis.

10. The steering apparatus according to claim 8, wherein the decoupling element is of arcuate configuration, with in each case one second connecting arrangement of the at least one second connecting arrangement being arranged on opposite end sections of the decoupling element and the at least one first connecting arrangement being arranged between the second connecting arrangements of the at least one second connecting arrangement, and the decoupling element is arranged as to extend around the steering axis.

11. The steering apparatus according to claim 9, further comprising:

a safety pin arranged on the handlebar bridge or the fork bridge, the safety pin extending parallel to the steering axis from the handlebar bridge or the fork bridge to a recess in the respective other one of the fork bridge or the handlebar bridge.

12. The steering apparatus according to claim 10, further comprising:

a safety pin arranged on the handlebar bridge or the fork bridge, the safety pin extending parallel to the steering axis from the handlebar bridge or the fork bridge to a recess in the respective other one of the fork bridge or the handlebar bridge.

13. A motorcycle having a steering apparatus, comprising:

two fork legs;

a handlebar bridge configured to receive a motorcycle handlebar;

an upper fork bridge;

a lower fork bridge;

a decoupling element configured to connect the handlebar bridge to the upper fork bridge;

a trailing arm and a suspension strut, wherein the upper and the lower fork bridge are configured to connects the two fork legs to one another, the trailing arm is configured to connect the lower fork bridge movably to a motorcycle frame of the motorcycle, the suspension strut is configured to support the trailing arm with respect to the motorcycle frame, when in an installed position, the handlebar bridge is rotatable about a steering axis and is fixed about a tilt axis orthogonal to the steering axis, the upper fork bridge is configured to tilt-decouple the fork legs from the handlebar bridge, the handlebar bridge is rotatable about a steering axis and is fixed about a tilt axis orthogonal to the steering axis, the upper fork bridge is rotatable about the steering axis and about the tilt axis the decoupling element is elastic and is configured to transmit a steering movement in a steering direction about the steering axis from the handlebar bridge to the fork bridge, and to compensate for a tilt movement in a tilt direction about the tilt axis of the fork bridge relative to the handlebar bridge by elastic deformation.

14. The motorcycle according to claim 13, further comprising:

a steering pin fixed on the handlebar bridge; and a pivot bearing having an inner ring and an outer ring, wherein the steering pin extends coaxially along the steering axis and is configured to be mounted rotatably on the motorcycle frame of the motorcycle such that the handlebar bridge is connectable by the steering pin to the motorcycle frame, the inner ring of the pivot bearing is configured to be arranged on the steering pin or the motorcycle frame concentrically with the steering axis, and the outer ring of the pivot bearing is configured to be connected to the fork bridge.

15. The motorcycle according to claim 13, wherein the decoupling element is flat, is arranged in a plane with the tilt axis, and extends substantially in a plane orthogonal to the steering axis, and the decoupling element has at least one first connecting arrangement by which the decoupling element is fixable on the handlebar bridge and at least one second connecting arrangement by which the decoupling element is fixable on the upper fork bridge.

\* \* \* \* \*